(12) United States Patent
Yamanaka

(10) Patent No.: US 7,094,841 B2
(45) Date of Patent: Aug. 22, 2006

(54) PRIMER COMPOSITION AND BONDING METHOD

(75) Inventor: Yoshimichi Yamanaka, Toyonaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/865,938

(22) Filed: Jun. 14, 2004

(65) Prior Publication Data

US 2004/0224096 A1 Nov. 11, 2004

Related U.S. Application Data

(62) Division of application No. 09/854,474, filed on May 15, 2001, now Pat. No. 6,773,758.

(30) Foreign Application Priority Data

| May 17, 2000 | (JP) | ............................. 2000-144334 |
| May 29, 2000 | (JP) | ............................. 2000-157818 |
| May 31, 2000 | (JP) | ............................. 2000-161417 |
| Sep. 27, 2000 | (JP) | ............................. 2000-294639 |

(51) Int. Cl.
*C08L 83/16* (2006.01)
*C08G 77/38* (2006.01)

(52) U.S. Cl. ...................... 525/474; 525/477; 525/479; 526/279; 528/35

(58) Field of Classification Search ................ 525/100, 525/105, 106, 476, 475, 477, 478, 479; 528/18, 528/25, 26, 29
See application file for complete search history.

(56) References Cited

U.S. PATENT DOCUMENTS

| 4,749,741 A | 6/1988 | Saito et al. ................. 524/859 |
| 4,788,254 A | 11/1988 | Kawakubo et al. ......... 525/100 |
| 4,981,728 A | 1/1991 | Homma et al. ............. 427/386 |
| 5,520,767 A * | 5/1996 | Larson ..................... 156/307.5 |
| 5,928,794 A * | 7/1999 | Kalinowski et al. ........ 428/447 |
| 5,942,583 A | 8/1999 | Azechi ....................... 525/403 |
| 5,985,371 A | 11/1999 | Fujioka et al. .............. 427/387 |
| 6,273,985 B1 | 8/2001 | DeLouise et al. ......... 156/273.3 |
| 6,451,439 B1 | 9/2002 | Okamoto et al. ........... 428/447 |
| 6,576,082 B1 * | 6/2003 | Okamoto et al. ........... 156/329 |
| 2002/0086942 A1 * | 7/2002 | Fujita et al. ................ 525/100 |

FOREIGN PATENT DOCUMENTS

| EP | 0 982 359 | | 3/2000 |
| EP | 0 984 034 | | 3/2000 |
| JP | 09-316293 | * | 12/1997 |
| JP | 10-204222 | | 8/1998 |
| JP | WO 99/05215 | * | 2/1999 |
| JP | 2000-073010 | | 3/2000 |
| JP | 2000-086990 | * | 3/2000 |

OTHER PUBLICATIONS

Machine Translation, JP 09-316293, Sakaguchi et al., Dec. 1997.*
Machine Translation, JP 2000-086990, Murase et al., Mar. 2000.*
Definition of "alkyl" as provided in Hawley's Condensed Chemical Dictionary, 14th Edition.*

* cited by examiner

*Primary Examiner*—Marc S. Zimmer
(74) *Attorney, Agent, or Firm*—Westerman, Hattori, Daniels & Adrian, LLP

(57) ABSTRACT

This invention provides a primer composition comprising the following (A), (B), (C) and (D) components:
(A) a saturated hydrocarbon polymer having at least one alkenyl group per molecule,
(B) a silane coupling agent,
(C) a polyvalent alkoxysilane and/or a condensation product thereof, and
(D) an organoaluminum compound and/or an organotitanium compound.

5 Claims, No Drawings

PRIMER COMPOSITION AND BONDING METHOD

This application is a divisional application of prior application Ser. No. 09/854,474 filed May 15, 2001, now issued as U.S. Pat. No. 6,773,758.

FIELD OF THE INVENTION

The present invention relates to a primer composition effective in bonding an addition reaction type saturated hydrocarbon polymer securely to various substrates. More particularly, the invention relates to a primer technology for achieving improved bonds to substrates and a technology of improving the adhesion of an addition type cured product which comprises coating a primer on a substrate and then applying an addition reaction type curable composition comprising a saturated hydrocarbon polymer thereon and letting it cure in situ.

BACKGROUND OF THE INVENTION

A curable resin (also known as an addition type curable composition) in which a saturated hydrocarbon polymer containing at least one alkenyl group within its molecule is crosslinked with a curing agent having two or more silicon-bound hydrogen atoms per molecule has been disclosed in Japanese Kokai Publication Hei-2-75644 and Japanese Kokai Publication Hei-3-181565, for instance. The cured product derived from such a composition (which artifact is also known as an addition type cured product) has excellent weather resistance, high heat resistance and low moisture permeability and, therefore, is expected to find application in a broad spectrum of end uses.

Particularly when an addition type curable composition comprising a saturated hydrocarbon polymer is used as a coating or dipping agent or a sealant for various substrates, it must have a high adhesiveness for the various substrates. The known technology of imparting adhesiveness to such an addition type curable composition comprising a saturated hydrocarbon polymer involves addition of various adhesion-improving agents to an addition type curable composition. By way of illustration, Japanese Kokai Publication Hei-4-185687 discloses a technique comprising adding a silane coupling agent to an addition type curable composition; Japanese Kokai Publication Hei-08-134165 discloses a technique comprising adding a nitrogen-containing epoxy compound and a silane coupling agent; Japanese Kokai Publication Hei-08-134165 discloses a technique comprising adding an isocyanate-containing compound and a silane coupling agent; Japanese Kokai Publication Hei-09-316293 and Japanese Kokai Publication Hei-10-204222 disclose a technology comprising adding a silane coupling agent, an alkoxysilane condensate and an organoaluminum and/or organotitanium compound. These techniques have the disadvantage, inter alia, that, depending on the kind of silane coupling agent, a retardation of cure may take place.

SUMMARY OF THE INVENTION

The object of the invention is to provide a primer composition which is effective in achieving a firm bond between a various substrate and a cured product derived from a hydrosilylation-curable composition comprising a saturated hydrocarbon polymer containing at least one alkenyl group per molecule and a curing agent having two or more hydrogen atoms bound to silicon per molecule and to provide a bonding method.

Landing on a concept representing a complete departure from the prior art, the inventors of the present invention discovered that an addition type curable composition comprising a saturated hydrocarbon polymer containing at least one alkenyl group per molecule and a curing agent having two or more hydrogen atoms bound to silicon per molecule and a cured product derived therefrom can be bonded to various substrates by utilizing a primer composition.

The present invention, therefore, is concerned with a primer composition comprising the following (A), (B), (C) and (D) components:

(A) a saturated hydrocarbon polymer containing at least one alkenyl group per molecule
(B) a silane coupling agent
(C) a polyvalent alkoxysilane and/or a condensation product thereof, and
(D) an organoaluminum compound and/or an organotitanium compound.

The present invention is further concerned with a primer composition comprising the following (E) component in addition to said (B), (C) and (D) components:

(E) a vinyl copolymer having a backbone structure substantially comprised of a vinyl copolymer chain and containing a silicon-containing group having a hydroxyl or hydrolyzable group bound to a silicon atom and capable of crosslinking by siloxane bonding terminally of its backbone and/or side chain.

In this invention, the preferred (E) component vinyl copolymer has a number average molecular weight in the range of 500 to 50000 and contains a hydrolyzable silyl group of the general formula (1) terminally of its backbone and/or side chain.

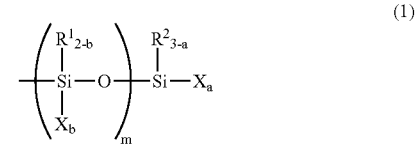

$$\left( \begin{array}{c} R^1{}_{2-b} \\ | \\ -Si-O \\ | \\ X_b \end{array} \right)_m \begin{array}{c} R^2{}_{3-a} \\ | \\ -Si-X_a \end{array} \quad (1)$$

in which $R^1$ and $R^2$ each independently represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$, where R' groups each independently represents a substituted or unsubstituted hydrocarbon group containing 1 to 20 carbon atoms; X groups each independently represents a hydroxyl group or a hydrolyzable group; a denotes 0, 1, 2 or 3; b denotes 0, 1 or 2; but both a and b are not equal to 0; m denotes an integer of 0 to 19.

A further preferred composition comprises a saturated hydrocarbon polymer containing at least one alkenyl group per molecule, that is said (A) component, in addition to said (B) to (E) components.

More preferably, in this invention, the (A) component saturated hydrocarbon polymer is a polyisobutylene polymer having a number average molecular weight in the range of 500 to 50000 and containing at least one alkenyl group terminally of its backbone and/or side chain.

Moreover, in this invention, the (B) component silane coupling agent is a silane coupling agent having at least one of epoxy group, a vinyl group and a (meth)acryloyl group, and may advantageously be a mixture of two or more specific silane coupling agents.

In addition, a further preferred primer composition of the invention comprises a hydrosilylation catalyst as (F) component.

The present invention is further directed to a bonding method for bonding a cured product to a substrate which comprises coating a primer composition comprising a silane coupling agent as said (B) component on a substrate and then applying a curable composition comprising a saturated hydrocarbon polymer having at least one alkenyl group per molecule onto the primed substrate.

In this invention, it is preferable to formulate a polyvalent alkoxysilane and/or a condensation product thereof as (C) component and an organoaluminum compound and/or an organotitanium compound as (D) component in addition to said (B) component. Furthermore, it is preferable to add a hydrosilylation catalyst as (F) component and still more preferably add an organic solvent as (G) component.

The invention is further concerned with a bonding method for bonding a cured product to a substrate which comprises coating a primer composition comprising a polyvalent alkoxysilane and/or a condensation product thereof as (C) component and an organoaluminum compound and/or an organotitanium compound as (D) component on a substrate and then applying a curable composition comprising a saturated hydrocarbon polymer having at least one alkenyl group per molecule to the primed substrate.

Preferably, in this invention, said saturated hydrocarbon polymer having at least one alkenyl group per molecule is a polyisobutylene polymer containing at least one alkenyl group terminally of its backbone and/or side chain and having a number average molecular weight in the range of 500 to 50000.

Furthermore, in this invention, the (B) component silane coupling agent is one or more kinds of silane coupling agent(s) containing an epoxy group, a vinyl group or a (meth)acryloyl group.

The invention is further concerned with a laminate comprising a substrate and a cured product as obtainable by the above bonding method.

DETAILED DESCRIPTION OF THE INVENTION

The primer composition and addition type curable composition which are to be used in the practice of the present invention are now described in detail.

The (A) component for use in the invention is a saturated hydrocarbon polymer having at least one hydrosilylatable alkenyl group within its molecule. The hydrosilylatable alkenyl group is not particularly restricted as far as it is a group containing a carbon-carbon double bond active for hydrosilylation. As such alkenyl groups, there may be mentioned aliphatic unsaturated hydrocarbon groups such as vinyl, allyl, methylvinyl, propenyl, butenyl, pentenyl, hexenyl, etc. and cyclic unsaturated hydrocarbon groups such as cyclopropenyl, cyclobutenyl, cyclopentenyl, cyclohexenyl and so on. In the present invention, the (A) component preferably has 1 to 10 alkenyl groups per molecule.

The polymer constituting the backbone of the (A) component saturated hydrocarbon polymer can be prepared by, for example, (1) polymerizing an olefinic compound containing 1 to 6 carbon atoms, such as ethylene, propylene, 1-butene, isobutylene and the like, as a main monomer or (2) homopolymerizing a diene compound, such as butadiene, isoprene and the like, or copolymerizing said olefinic compound with said diene compound, followed by hydrogenation. In terms of the ease with which a functional group may be introduced terminally of the polymer, the molecular weight of the polymer be well controlled, and the number of terminal functional groups be increased, an isobutylene polymer, a hydrogenated polybutadiene polymer or a hydrogenated polyisoprene polymer is preferred.

The isobutylene polymer mentioned above may be exclusively composed of isobutylene or may contain a unit monomer or monomers copolymerizable with isobutylene in a proportion of preferably not more than 50% (% by weight; the same applies hereinafter), more preferably not more than 30%, most preferably not more than 20%.

As such unit monomers, there can be mentioned olefins of 4 to 12 carbon atoms, vinyl ethers, aromatic vinyl compounds, vinylsilanes, allylsilanes and so on. Specific examples are 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyldimethylmethoxysilane, vinyltrimethylsilane, divinyldimethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane, γ-methacryloyloxypropyltrimethoxysilane and γ-methacryloyloxypropylmethyldimethoxysilane, among others.

The hydrogenated polybutadiene polymer or other saturated hydrocarbon polymer may also contain unit monomers other than the main monomer just as said isobutylene polymer.

The saturated hydrocarbon polymer for use as (A) component in the invention may be prepared using a monomer component leaving a double bond after polymerization, such as a polyene compound, e.g. butadiene, isoprene or the like, in a proportion not jeopardizing the object of the invention, i.e. in a small proportion, preferably within the range of not more than 10%.

The saturated hydrocarbon polymer, preferably an isobutylene polymer, a hydrogenated polyisoprene polymer or a hydrogenated polybutadiene polymer, preferably has a number average molecular weight (GPC method; polystyrene equivalent) of not more than 100000, more preferably about 500 to 100000. In consideration of the ease of handling, a liquid polymer having sufficient fluidity with a molecular weight of about 1000 to 40000 is particularly preferred.

The technology of preparing (A) component for use in the invention includes a method comprising reacting a polymer having a hydroxyl or other functional group with a compound having an unsaturated group to introduce the unsaturated group into the polymer as described in Japanese Kokai Publication Hei-3-152164 or Japanese Kokai Publication Hei-7-304909. There may also be mentioned a Friedel-Crafts reaction method using an alkenyl phenyl ether to introduce an unsaturated group into a halogen-containing polymer, a substitution reaction method using an allyltrimethylsilane or the like in the presence of a Lewis acid, and a method comprising carrying out a Friedel-Crafts reaction with a phenol compound to introduce a hydroxyl group and, then, carrying out the above alkenyl group-introducing reaction. It is also possible to use methods in which unsaturated groups are introduced in the course of polymerization of the monomer as disclosed in U.S. Pat. No. 4,316,973, Japanese Kokai Publication Sho-63-105005 and Japanese Kokai Publication Hei-4-288309.

The silane coupling agent for use as (B) component in the invention is preferably a silane coupling agent having a silicon-bound alkoxy group and at least one functional group selected from the group consisting of epoxy, methacryl, acryl, isocyanate, isocyanurate, vinyl and carbamate groups. Among said functional groups, one having an epoxy, vinyl, methacryl or acryl group in the molecule is particularly preferred from the standpoint of curability and adhesion. Specifically, there can be mentioned such organosilicon compounds having an epoxy functional group and silicon-bound alkoxy groups as 3-glycidoxypropyltrimethoxysilane, 3-glycidoxypropyltriethoxysilane, 2-(3,4-epoxycyclohexyl) ethyltrimethoxysilane and 2-(3,4-epoxycyclohexyl)ethyltriethoxysilane. As organosilicon compounds having a vinyl group and silicon-bound alkoxy groups, there can be mentioned vinyltrimethoxysilane and vinyltriethoxysilane, among others. Furthermore, as organosilicon compounds having a methacryl or acryl group and silicon-bound alkoxy groups, there can be mentioned 3-methacryloxypropyltrimethoxysilane, 3-methacryloxypropyltriethoxysilane, 3-acryloxypropyltrimethoxysilane, 3-acryloxypropyltriethoxysilane, methacryloxymethyltrimethoxysilane, methacryloxymethyltriethoxysilane, acryloxymethyltrimethoxysilane, acryloxymethyltriethoxysilane and so on.

While the polyvalent alkoxysilane for use as (C) component in the invention has only those groups selected from among alkyl and alkoxy groups as substituents on the silicon atom, its partial hydrolysate and a dehydrative condensation product thereof (silanol condensation product) is also included. As specific examples of the polyvalent alkoxysilane for (C) component, there can be mentioned tetraalkoxysilanes such as tetramethoxysilane, tetraethoxysilane, tetra (n-propyloxy)silane, tetra(n-butoxy)silane, etc., inclusive of their condensation products, and trialkoxysilanes such as methyltriethoxysilane, ethyltriethoxysilane, etc., inclusive of their condensation products.

The condensation catalyst for use as (D) component in the invention includes organoaluminum compounds and organotitanium compounds. Preferred organoaluminum compounds are chelate organic complexes which are acknowledged to be useful for catalyzing the hydrolytic condensation reaction of alkoxysilyl groups. As a specific example, there can be mentioned aluminum acetylacetonate. The preferred organotitanium compound is an organotitanium compound containing a Ti—O—C bond which is acknowledged to be useful for catalyzing the hydrolytic condensation reaction of alkoxysilyl groups. More specifically, tetraalkoxytitaniums such as tetraisopropoxytitanium, tetrabutoxytitanium, etc., and general-purpose titanate coupling agents such as those having hydroxyacetic acid or ethylene glycol or the like as a residue can be employed.

The vinyl copolymer having a reactive silicon-containing group for use as (E) component in the invention (hereinafter referred to as silyl-containing vinyl polymer) is a polymer whose backbone structure is substantially comprised of a vinyl polymer chain and optionally having a segment other than the vinyl monomer segment, such as a segment comprising a urethane bond or a siloxane bond within the range not substantially affecting the characteristics of a vinyl polymer. Generally speaking, the properties characteristic of a vinyl polymer are not affected materially even when the polymer contains a segment or segments other than the segment composed of a vinyl monomer in a proportion of not more than about 50 atom % based on the total number of atoms constituting its backbone chain. As the backbone chain is thus comprised substantially of a vinyl polymer, said silyl-containing polymer functions as a primer with good durability and resistance to chemicals, for instance.

The reactive silicon-containing group may for example represented by the general formula (1):

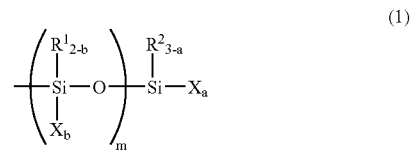

wherein $R^1$ and $R^2$ each independently represents an alkyl group of 1 to 20 carbon atoms, an aryl group of 6 to 20 carbon atoms, an aralkyl group of 7 to 20 carbon atoms, or a triorganosiloxy group of the formula $(R')_3SiO$—, where R' groups each represents a substituted or unsubstituted $C_{1-20}$ hydrocarbon group; X groups each independently represents a hydroxyl group or a hydrolyzable group; a is equal to 0, 1, 2 or 3; b is equal to 0, 1 or 2; although both a and b are not equal to 0; m is an integer of 0 to 19.

The hydrolyzable group includes conventional groups such as hydrogen, halogen, alkoxy, acyloxy, ketoximato, amino, amido, aminooxy, mercapto, alkenyloxy, etc. Among these, alkoxy, amido and aminooxy are preferred. In terms of the hydrolyzability under mild conditions and ease of handling, alkoxy groups are particularly preferred.

The hydrolyzable group and/or hydroxyl group may be attached, in the number of 1 to 3, to one silicon atom and $(a+\Sigma b)$ is preferably within the range of 1 to 5. When two or more hydrolyzable groups or hydroxyl groups are present in the reactive silicon-containing group, these groups may be the same or different.

While the number of silicon atoms constituting said reactive silicon-containing group is at least one, it is preferably not more than 20 at the maximum when silicon atoms are linked by siloxane bonding.

Particularly, a reactive silicon-containing group of the general formula (2) is preferred from availability points of view;

wherein $R^2$, X and a are as defined hereinbefore.

That said silyl-containing vinyl polymer has at least one hydrolyzable silyl group terminally of its backbone and/or side chain means that the polymer contains at least one hydrolyzable silyl group, preferably not less than two hydrolyzable silyl groups, per molecule at a terminus of its main chain or at the terminus of its side chain. Because of the presence of at least one hydrolyzable silyl group per molecule, the polymer gains in molecular mass or undergoes gelation in the presence of water, forming chemically stable siloxane bonds to improve the chemical resistance and other properties of the coating film. Moreover, the hydrolyzable silyl groups have a good affinity for inorganic substrates and undergo crosslinking in the presence of water so that an intimate bond can be established between the coating film and the inorganic substrate.

The preferred number average molecular weight of said silyl-containing vinyl polymer is about 500 to 50,000 and, in terms of the ease of handling, the range of about 1,000 to 20,000 is particularly preferred.

The glass transition point (Tg) of the polymer is not particularly restricted, either, but a low-shrinkage characteristic develops in the polymer when its Tg is as low as 10° C. or still lower, while the chemical resistance, water resistance and substrate-reinforcing effect are improved when the Tg of the polymer is as high as 30° C. and above.

Various methods are available for the production of said silyl-containing vinyl polymer. For example, there can be mentioned (i) a method which comprises copolymerizing a vinyl monomer with a hydrolyzable silyl group-containing monomer (hereinafter referred to as silyl-containing monomer) and (ii) a method which comprises copolymerizing a vinyl monomer with a monomer having a reactive functional group (hereinafter referred to as X group) [e.g. acrylic acid] and further reacting the resulting copolymer with a compound having a reactive silicon-containing group and a functional group capable of reacting with the X group [e.g. a compound having an isocyanate group and a —Si(OCH$_3$) group].

The vinyl monomer mentioned just above is not particularly restricted but includes, among others, esters of unsaturated carboxylic acids, such as methyl (meth)acrylate, ethyl (meth)acrylate, n-butyl (meth)acrylate, isobutyl (meth)acrylate, t-butyl (meth)acrylate, 2-ethylhexyl (meth)acrylate, lauryl (meth)acrylate, stearyl (meth)acrylate, benzyl (meth) acrylate, cyclohexyl (meth)acrylate, trifluoroethyl (meth) acrylate, pentafluoropropyl (meth) acrylate, diesters or hemiesters of polycarboxylic acids (maleic acid, fumaric acid, itaconic acid, etc.) with a straight-chain or branched-chain alcohols containing 1 to 20 carbon atoms, etc.; aromatic hydrocarbon type vinyl compounds such as styrene, α-methylstyrene, chlorostyrene, styrensulfonic acid, 4-hydroxystyrene, vinyltoluene, etc.; vinyl esters and allyl compounds, such as vinyl acetate, vinyl propionate, diallyl phthalate, etc.; nitrile-containing vinyl compounds such as (meth) acrylonitrile; epoxy-containing vinyl compounds such as glycidyl (meth)acrylate; amino-containing vinyl compounds such as dimethylaminoethyl (meth)acrylate, diethylaminoethyl (meth)acrylate, vinylpyridine, aminoethyl vinyl ether, etc.; amido-containing vinyl compounds such as (meth)acrylamide, itaconic acid diamide, α-ethylacrylamide, methacrylamide, crotonamide, maleic acid diamide, fumaric acid diamide, N-vinylpyrrolidone, N-butoxymethyl (meth) acrylamide, N,N-dimethylacrylamide, N-methylacrylamide, acryloylmorpholine, etc.; hydroxy-containing vinyl compounds such as 2-hydroxyethyl (meth) acrylate, 2-hydroxypropyl (meth)acrylate, 2-hydroxyethyl vinyl ether, N-methylol(meth)acrylamide, Aronix 5700 (product of To a Gosei Chemical Industry Co.), Placcel FA-1, Placcel FA-4, Placcel FA-1, Placcel FA-4 (products of Daicel Chemical Co.), etc.; unsaturated carboxylic acids and acid anhydrides, inclusive of their salts, such as (meth) acrylic acid, maleic acid, fumaric acid, itaconic acid, etc., salts thereof (alkali metal salts, ammonium salts, amine salts, etc.), maleic anhydride, etc.; and other vinyl compounds such as vinyl methyl ether, vinyl chloride, vinylidene chloride, chloroprene, propylene, butadiene, isoprene, maleimide, N-vinylimidazole, vinylsulfonic acids and so on. Among these, alkyl (meth)acrylates containing 10 or more carbon atoms, such as lauryl (meth) acrylate and stearyl (meth) acrylate, are still more preferred because they provide for coats having a good affinity even for a low-polarity curable composition containing a saturated hydrocarbon polymer.

Thus, for producing a silyl-containing vinyl polymer with a low Tg value of, for example, not higher than 10° C., it is only sufficient to use a vinyl monomer which would give a homopolymer having a low Tg value, such as butyl acrylate and 2-ethylhexyl (meth)acrylate, in a large proportion. On the other hand, for producing a silyl-containing vinyl polymer with a high Tg value of, for example, 30° C. or higher, it is only sufficient to use a vinyl monomer which would give a homopolymer having a high Tg value, such as methyl methacrylate, ethyl methacrylate and styrene.

The silyl-containing monomer mentioned above is not particularly restricted but includes the following compounds, among others.

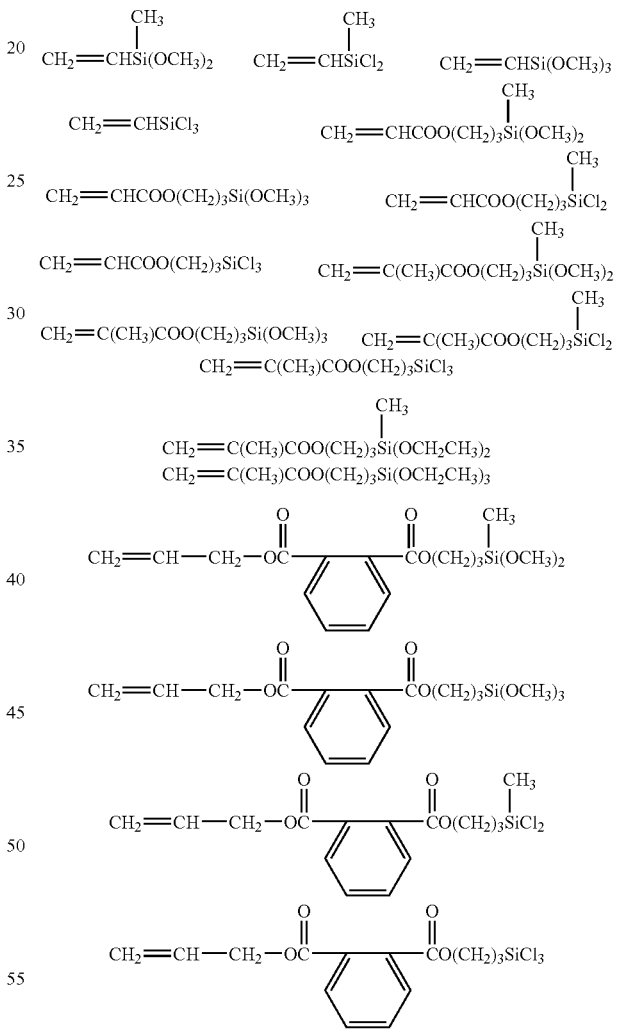

The technology of producing a silyl-containing vinyl polymer from such a silyl-containing monomer and a vinyl monomer is not particularly restricted but includes the production processes disclosed in Japanese Kokai Publication Sho-54-36395, Japanese Kokai Publication Sho-57-36109 and Japanese Kokai Publication Sho-58-157810, among others. The solution polymerization technique using an azo type radical initiator such as 2,2'-azobisisobutyronitrile or 2,2'-azobis(2-methylbutyronitrile) is most preferred because the initiator can be easily handled and the polymerization reaction mixture obtained can be utilized as it is.

Where necessary, in the above production procedure, molecular weight modulation can be made using a chain transfer agent such as n-dodecylmercaptan, t-dodecylmercaptan, n-butylmercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si\text{—}S\text{—}S\text{—}Si(OCH_3)_3$, $(CH_3O)_3Si\text{—}S_8\text{—}S\text{—}Si(OCH_3)_3$ or the like.

Particularly, by using a chain transfer agent having a hydrolyzable silyl group within its molecule, for example γ-mercaptopropyltrimethoxysilane, the hydrolyzable silyl group can be introduced terminally of the resulting silyl-containing vinyl polymer.

As the polymerization solvent, non-reactive solvents such as hydrocarbons (e.g. toluene, xylene, n-hexane, cyclohexane, etc.), acetic acid esters (e.g. ethyl acetate, butyl acetate, etc.), alcohols (e.g. methanol, ethanol, isopropyl alcohol, n-butanol, etc.), ethers (e.g. ethyl Cellosolve, butyl Cellosolve, Cellosolve acetate, etc.) and ketones (e.g. methyl ethyl ketone, ethyl acetoacetate, acetylacetone, diacetone alcohol, methyl isobutyl ketone, acetone, etc.) can be freely used.

The amount of the silyl group-containing vinyl polymer in the primer composition of the invention is preferably not less than 1%, more preferably not less than 3%, still more preferably not less than 5%. The silyl group-containing vinyl polymer may be a single polymer species or a mixture of two or more polymer species.

The hydrosilylation catalyst for use as (F) component in the invention is not particularly restricted but may be an arbitrary one.

For example, there can be mentioned chloroplatinic acid, platinum as simple substance, solid platinum as immobilized on an alumina, silica, carbon black or other support; platinum-vinylsiloxane complexes [e.g. $Pt_n(ViMe_2SiOSiMe_2Vi)_n$, $Pt[(MeViSiO)_4]_m$]; platinum-phosphine complexes [e.g. $Pt(PPh_3)_4$, $Pt(PBu_3)_4$]; platinum-phosphite complexes [e.g. $Pt[P(OPh)_3]_4$, $Pt[P(OBu)_3]_4$ (In the above formulas, Me stands for methyl, Bu for butyl, Vi for vinyl, Ph for phenyl; n and m each represents an integer), $Pt(acac)_2$, the platinum-hydrocarbon complexes described in U.S. Pat. Nos. 3,159,601 and 3,159,662 issued to Ashby et al., and the platinum alcoholate catalyst described in U.S. Pat. No. 3,220,972 issued to Lamoreaux et al.

As examples of the catalyst other than platinum compounds, there can be mentioned $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and so on. These catalysts may be used independently or two or more of them may be used in combination. In terms of catalyst activity, chloroplatinic acid, platinum-olefin complexes, platinum-vinylsiloxane complexes and $Pt(acac)_2$ are preferred.

The organic solvent for use as (G) component in the invention is intended to adjust the primer composition to a suitable viscosity for priming. The solvent may be any solvent that is capable of dissolving (A) to (F) components and is not particularly restricted in kind. As examples, there can be mentioned hydrocarbon solvents such as toluene, xylene, heptane, hexane, petroleum solvents, etc.; halogen-containing solvents such as trichloroethylene; ester solvents such as ethyl acetate, butyl acetate, etc.; ketone solvents such as acetone, methyl ethyl ketone, methyl isobutyl ketone, etc.; silicon-containing solvents such as hexamethylcyclotrisiloxane, octamethylcyclotetrasiloxane, decamethylcyclopentasiloxane, etc., among others. These solvents may be used independently or two or more of them may be used in combination.

The curable composition which can be advantageously used in combination with the primer composition of the present invention comprises a saturated hydrocarbon polymer having at least one alkenyl group per molecule. It preferably comprises a curing agent as well.

The above-mentioned saturated hydrocarbon polymer having at least one alkenyl group per molecule may be one similar to the (A) component of the primer composition of the invention.

The curing agent mentioned above is not particularly restricted as far as it contains two or more hydrosilyl groups per molecule. Here, one hydrosilyl group means one SiH group, with the understanding that the case in which 2 hydrogen atoms are attached to one and the same Si atom is counted as 2 hydrosilyl groups.

As the curing agent, an organohydrogen polysiloxane is one of the preferred examples. The term "organohydrogen polysiloxane" as used herein means a polysiloxane having hydrocarbon groups or hydrogen atoms on silicon atoms, which includes the following acyclic and cyclic structures, for instance.

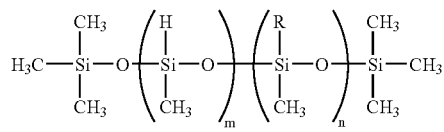

$2 \leq m+n \leq 50$, $2<m$, $0 \leq n$, R is a hydroxycarbon group whose main chain contains 2 to 20 carbon atoms and may have one or more phenyl groups.

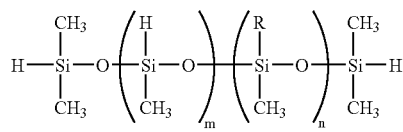

$0<m+n \leq 50$, $0<m$, $0 \leq n$, R is a hydroxycarbon group whose main chain contains 2 to 20 carbon atoms and may have one or more phenyl groups.

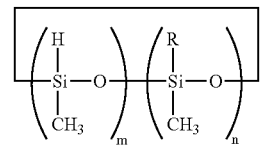

$3 \leq m+n \leq 20$, $2<m+n \leq 19$, $0 \leq n<18$, R is a hydroxycarbon group whose main chain contains 2 to 20 carbon atoms and may have one or more phenyl groups.

Among the various hydrosilyl-containing groups mentioned above, the following group is particularly preferred in view of the low likelihood of reducing the compatibility of the hydrosilyl-containing curing agent of the invention with the saturated hydrocarbon polymer.

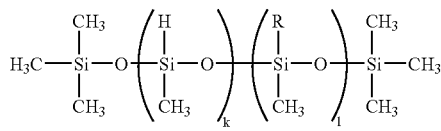

The number of hydrosilyl groups to be present in such a curing agent need only be at least 2 per molecule but is preferably 2 to 40, more preferably 3 to 30. In causing the composition of the invention to cure by hydrosilylation reaction, the curing reaction is retarded to cause an inadequate cure when the number of hydrosilyl groups is less than 2. On the other hand, when the number of hydrosilyl groups exceeds 40, the stability of the curing agent is adversely affected and, in addition, a large proportion of hydrosilyl groups remain in the cured product to cause voids and cracks in some cases.

In the curable composition to be used in accordance with the invention, the molar ratio of the alkenyl group in the saturated hydrocarbon polymer to the hydrosilyl group in the curing agent is generally 1:0.5 to 1:5, preferably 1:0.8 to 1:3, still more preferably 1:1 to 1:2.5.

Furthermore, the curable composition to be used in the invention may optionally be supplemented with other components such as filler, antioxidant, ultraviolet absorber, pigment, surfactant, etc. as well as an adhesion-imparting agent for improving the adhesion of the curable composition. As examples of the filler, there can be mentioned inorganic compounds such as titanium dioxide, zinc bloom, barium sulfate, etc. and organic fillers such as polypropylene, polyethylene, polyacrylic esters and so on. As the adhesion-imparting agent, various silane coupling agents which do not deactivate the catalyst, such as epoxy, olefinic, methacrylic, ester, and tertiary amine series silane coupling agents can be mentioned. Particularly, when the primer is coated on a substrate, it is not always necessary to impart adhesion to the curable composition but it does not matter whether adhesion is imparted to the curable composition or not.

The bonding method of the invention includes the following mode, among others.

(1) The primer composition is first coated on the surface of a substrate and the primer is cured within a temperature range of room temperature to 150° C. for 1 minute to 60 minutes.

(2) Then, on the primed surface, an addition type curable composition comprising a saturated hydrocarbon polymer is coated and cured in situ under the curing conditions specific to the particular addition type curable composition of this saturated hydrocarbon polymer.

The substrate includes aluminum, SUS, glass, polycarbonate, acrylic sheet, copperplate and so on.

The primer composition of the invention is expected to find application in a broad spectrum of uses exploiting its low moisture permeability, low hygroscopicity, low gas permeability, high heat resistance, high weather resistance, dielectric properties and shock absorbing properties, for example sealants, gaskets, adhesives, sealing-potting agents, various types of coatings, vibration dampers, and so on. Though such specific uses are not particularly restricted, there can be mentioned, among others, gaskets/sealants for capacitors, lithium cells, fuel cells, batteries, chemical plants, engines, fuel tanks, etc., architectural sealants, outdoor gaskets for roof water-proofing or solar cell sealing and other purposes, packings for pipes, electric circuit sealing boxes, packings for the caps of industrial cans, food cans and bottles, etc., or packings for ink cartridges and other high-performance ink materials, electronic circuit surface protective coatings, surface coatings for IC and other card materials, aluminum or other packing materials requiring chemical resistance for fuel cells and the like, sound-barrier or vibration damping sheet materials, roll materials for machinery and electric machinery, pipes for gases such as hydrogen and oxygen, and sealants for joints.

EXAMPLES

The following examples illustrate the present invention in further detail, it being to be understood that the scope of the invention is by no means defined thereby.

Examples 1 and 2 Comparative Example 1

According to the formulas shown in Table 1, primer compositions of Examples 1 and 2 and Comparative Example 1 were prepared.

These primer compositions were prepared by the following procedure. As (A) component, the allyl-terminated polyisobutylene having a molecular weight of about 10000 (product of Kaneka Corporation; EP400A) as synthesized in accordance with Japanese Kokai Publication Sho-63-105005 was dissolved in hexane. Then, a silane coupling agent comprising 3-glycidoxypropyltrimethoxysilane, vinyltrimethoxysilane and 3-methacryloxypropyltrimethoxysilane as (B) component, Ethyl Silicate 40 (product of Nippon Colcoat Co.) as (C) component tetra-n-butyl titanate as (D) component, polyvalent alkoxysilane condensate, and platinum-vinylsiloxane complex catalyst ($8.3 \times 10^{-5}$ mmol/μL, 3 wt. % in xylene) as (E) component were added and mixed.

On the other hand, an addition reaction type polyisobutylene curable composition was prepared by the following procedure and an adhesion test was carried out using the composition.

Thus, 100 g of an allyl-terminated polyisobutylene having a molecular weight of about 10000 (product of Kaneka Corporation; EP400A) was blended with 5 g of methylhydrogen polysiloxane (product of Kaneka Corporation; CR100). Then, 30 g of the plasticizer PAO5010 (product of Idemitsu Petrochemical Co.), 1 g of the antioxidant MARKAO-50 (product of Adeka-Argus), and 26 g of the filler hydrophobic-treated wet silica were mixed thoroughly by hand mixing and, using a 3-roller paint roll, the mixture was kneaded 3 times. To the resulting formulation were added 55.9 μL of platinum-vinylsiloxane complex catalyst ($8.3 \times 10^{-5}$ mmol/μL, 3 wt. % in xylene) and 25.1 μL of dimethyl maleate (product of Wako Pure Chemical), followed by hand mixing to prepare an addition reaction type polyisobutylene curable composition.

As a test for tensile adhesion, the primer composition was coated once on SUS304 or aluminum and heated at 110° C. for 30 minutes for coat formation. On this primed surface, the above curable composition was coated in a thickness of about 3 mm and cured at 60° C. for 40 minutes. After curing, a manual peeling test was carried out with the bonded surface being incised with a cutter knife. The substrate surface, after peeling, was observed to see whether the bond failure was cohesive failure (CF) or adhesive failure (AF). The results are shown in Table 1.

TABLE 1

|   |   | Ex. 1 | Ex. 2 | Compar. Ex. 1 |
|---|---|---|---|---|
|   | Primer formulation |   |   |   |
| (A) | EP400A | 10 | 10 |   |
| (B) | 3-Glycidoxypropyltrimethoxysilane | 1 | 2 | 1 |
|   | Vinyltrimethoxysilane | 0.5 | 1 | 0.5 |
|   | 3-Methacryloxypropyl-trimethoxysilane | 0.5 | 1 | 0.5 |
| (C) | Ethyl Silicate 40 | 2 | 4 | 2 |
| (D) | Tetra-n-butyl titanate | 2 | 4 | 2 |
| (F) | Platinum-vinylsiloxane complex catalyst | 10 | 10 | 10 |
| (G) | Hexane | 100 | 100 | 100 |
|   | Adhesiveness |   |   |   |
|   | AL | CF100 | CF100 | AF100 |
|   | SUS304 | CF100 | CF100 | AF100 |

CF100 represents 100% of CF, and AF100 represents 100% of AF.

The following is an example of production of the (E) component vinyl copolymer.

Production Example

A reactor equipped with a stirrer, thermometer, nitrogen gas inlet pipe, drip funnel and cooling jacket was charged with 50 g of toluene and the temperature was increased to 110° C. Then, a solution composed of 30 g of stearyl methacrylate, 70 g of γ-methacryloxypropyltrimethoxysilane, 0.5 g of 2,2'-azobis(2-methylbutyronitrile) and 50 g of toluene was fed to the reactor continuously over 3 hours. After completion of monomer charging, the polymerization reaction was further continued for 2 hours to give a silyl group-containing vinyl polymer with a nonvolatile fraction of 50 weight % and a GPC (polystyrene equivalent) number average molecular weight (Mn) of 15,000.

Examples 3 to 7 Comparative Example 2

According to the formulas shown in Table 2, primer compositions of Examples 3 to 7 and Comparative Example 2 were prepared.

The primer compositions were prepared by the following procedure. To the (E) component vinyl polymer synthesized in Production Example were added the silane coupling agent comprising 3-glycidoxypropyltrimethoxysilane, vinyltrimethoxysilane and 3-methacryloxypropyltrimethoxysilane as (B) component, the polyvalent alkoxysilane condensate Ethyl Silicate 40 (product of Nippon Colcoat Co.) as (C) component, tetra-n-butyl titanate as (D) component, and platinum-vinylsiloxane complex catalyst ($8.3\times10^{-5}$ mmol/μl, 3 wt. % in xylene) as (F) component, and after mixing, the solvent was added. When the (A) component was to be added, the (A) component was dissolved in hexane and added as such.

The evaluation of adhesion was made by the method described above. The results are shown in Table 2.

TABLE 2

|   |   | Example |   |   |   |   | Compar. Ex. |
|---|---|---|---|---|---|---|---|
|   |   | 3 | 4 | 5 | 6 | 7 | 2 |
|   | Primer formulation (weight parts) |   |   |   |   |   |   |
| (E) | Vinyl polymer* | 30 | 50 | 70 | 50 | 50 |   |
| (A) | EP400A |   |   |   | 5 | 10 |   |
| (B) | 3-Glycidoxypropyltrimethoxysilane | 1 | 1 | 1 | 1 | 1 | 1 |
|   | Vinyltrimethoxysilane | 0.5 | 0.5 | 0.5 | 0.5 | 0.5 | 0.5 |
|   | 3-Methacryloxypropyltrimethoxysilane | 0.5 | 0.5 | 0.5 | 0.5 | 0.5 | 0.5 |
| (C) | Ethyl Silicate 40 | 2 | 2 | 2 | 2 | 2 | 2 |
| (D) | Tetra-n-butyl titanate | 2 | 2 | 2 | 2 | 2 | 2 |
| (F) | Platinum-vinylsiloxane complex catalyst | 10 | 10 | 10 | 10 | 10 | 10 |
| (G) | Hexane | 100 | 100 | 100 | 100 | 100 | 100 |
|   | Adhesiveness |   |   |   |   |   |   |
|   | SUS304 | CF | CF | CF | CF | CF | AF |
|   | Al | CF | CF | CF | CF | CF | AF |

*50 weight % toluene

Examples 8 to 17 Comparatives 3 to 5

According to the formulas shown in Tables 3, 4 and 5, primer compositions of Examples 8 to 17 and Comparative Examples 3 to 5 were prepared.

These primer compositions were prepared by the following procedure. The silane coupling agent comprising 3-glycidoxypropyltrimethoxysilane, vinyltrimethoxysilane and 3-methacryloxypropyltrimethoxysilane as (B) component, the polyvalent alkoxysilane condensate Ethyl Silicate 40 (product of Nippon Colcoat Co.) as (C) component, tetra-n-butyl titanate as (D) component, and platinum-vinylsiloxane complex catalyst (3 wt % in xylene) as (F) component were mixed together and a suitable amount of hexane as (G) component was then added.

The evaluation of adhesion was made by the method described above. The results are shown in Tables 3, 4 and 5.

TABLE 3

|  |  | Example | | | | Compar. Ex. | |
| --- | --- | --- | --- | --- | --- | --- | --- |
|  |  | 8 | 9 | 10 | 11 | 3 | 4 |
| | Primer formulation (weight parts) | | | | | | |
| (B) | 3-Glycidoxypropyltrimethoxysilane | 1 | 2 | 1 | 1 | 1 | 0 |
| | Vinyltrimethoxysilane | 0.5 | 1 | 0.5 | 0.5 | 0.5 | 0 |
| | 3-Methacryloxypropyltrimethoxysilane | 0.5 | 1 | 0.5 | 0.5 | 0.5 | 0 |
| (C) | Ethyl Silicate 40 | 2 | 4 | | | 2 | 0 |
| (D) | Tetra-n-butyl titanate | 10 | 10 | | | 0 | 0 |
| (F) | Platinum-vinylsiloxane complex catalyst | 10 | 10 | | 10 | 10 | 0 |
| (G) | Hexane | 100 | 100 | 100 | 100 | 100 | 100 |
| | Adhesiveness | | | | | | |
| | SUS304 | CF | CF | CF | CF | AF | AF |
| | Al | CF | CF | CF | CF | AF | AF |

TABLE 4

|  |  | Ex. 12 |
| --- | --- | --- |
| | Primer formulation (weight parts) | |
| (B) | 3-Glycidoxypropyltrimethoxysilane | 1 |
| | Vinyltrimethoxysilane | 0.5 |
| | 3-Methacryloxypropyltrimethoxysilane | 0.5 |
| (C) | Ethyl Silicate 40 | |
| (D) | Tetra-n-butyl titanate | |
| (F) | Platinum-vinylsiloxane complex catalyst | 10 |
| (G) | Hexane | 100 |
| | Adhesiveness | |
| | FRP | CF |
| | Polycarbonate | CF |
| | Acrylic sheet | CF |

TABLE 5

|  |  | Example | | | | | Compar. Ex. |
| --- | --- | --- | --- | --- | --- | --- | --- |
|  |  | 13 | 14 | 15 | 16 | 17 | 5 |
| | Primer formulation (weight parts) | | | | | | |
| (B) | 3-Glycidoxypropyltrimethoxysilane | 1 | 1 | | | 1 | 0 |
| | Vinyltrimethoxysilane | 0.5 | | | 0.5 | | 0 |
| | 3-Methacryloxypropyltrimethoxysilane | 0.5 | | | 0.5 | | 0 |
| (C) | Ethyl Silicate 40 | 2 | 2 | 2 | 2 | 2 | 0 |
| (D) | Tetra-n-butyl titanate | 10 | 10 | 10 | 10 | 10 | 0 |
| (F) | Platinum-vinylsiloxane complex catalyst | 1 | 1 | 1 | | | 0 |
| (G) | Hexane | | | | | | 100 |
| | Adhesiveness | | | | | | |
| | Glass | CF | CF | CF | CF | CF | AF |
| | Copperplate | CF | — | — | — | — | AF |

It is apparent from the above examples that by using the primer composition of the invention, various substrates can be rendered sufficiently adhesive.

Thus, the present invention provides a bonding method insuring a remarkably improved adhesion of an addition type curable saturated hydrocarbon polymer composition to various substrates.

The invention claimed is:

1. A primer composition comprising the following (A), (B), (C), (D), (E) and (F) components:

(A) a saturated hydrocarbon polymer containing at least one alkenyl group per molecule, (B) a silane coupling agent, (C) a polyvalent alkoxysilane and/or a condensation product thereof, (D) an organoaluminum compound and/or an organotitanium compound, (E) a vinyl copolymer having a backbone structure substantially comprised of a vinyl copolymer chain and containing a silicon-containing group having a hydroxyl or hydrolyzable group bound to a silicon atom and capable of crosslinking by siloxane bonding terminally of its backbone chain and/or in its side chain, and (F) a hydrosilylation catalyst, wherein substituents on a silicon atom in the polyvalent alkoxysilane as the (C) component consist of at least one group selected from the group consisting of alkyl and alkoxy groups.

2. The primer composition according to claim 1 wherein the (E) component vinyl copolymer has a number average molecular weight in the range of 500 to 50000 and contains a hydrolyzable silyl group of the general formula (1) terminally of its backbone and/or side chain:

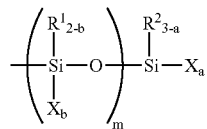

(1)

wherein $R^1$ and $R^2$ each independently represents an alkyl group of 1 to 20 carbon atoms, an aryl group of 6 to 20 carbon atoms, an aralkyl group of 7 to 20 carbon atoms, or a triorganosiloxy group of the formula $(R')_3SiO-$, where R' groups each independently represents a substituted or unsubstituted hydrocarbon group containing 1 to 20 carbon atoms; X groups each independently represents a hydroxyl group or a hydrolyzable group; a denotes 0, 1, 2 or 3; b denotes 0, 1 or 2; but both a and b are not equal to 0; m denotes an integer of 0 to 19.

3. The primer composition according to claim 1 or 2 wherein the (A) component saturated hydrocarbon polymer is a polyisobutylene polymer having a number average molecular weight in the range of 500 to 50000 and containing at least one alkenyl group terminally of its backbone and/or side chain.

4. The primer composition according to claim 1 or 2 wherein the (B) component silane coupling agent has at least one functional group selected from the group consisting of epoxy, vinyl and (meth)acryloyl groups.

5. The primer composition according to claim 1 or 2 comprising an organic solvent as (G) component.

* * * * *